April 3, 1928.
R. H. KITCHEN ET AL
1,664,751
DIRECTION INDICATOR
Filed March 15, 1926   2 Sheets-Sheet 1
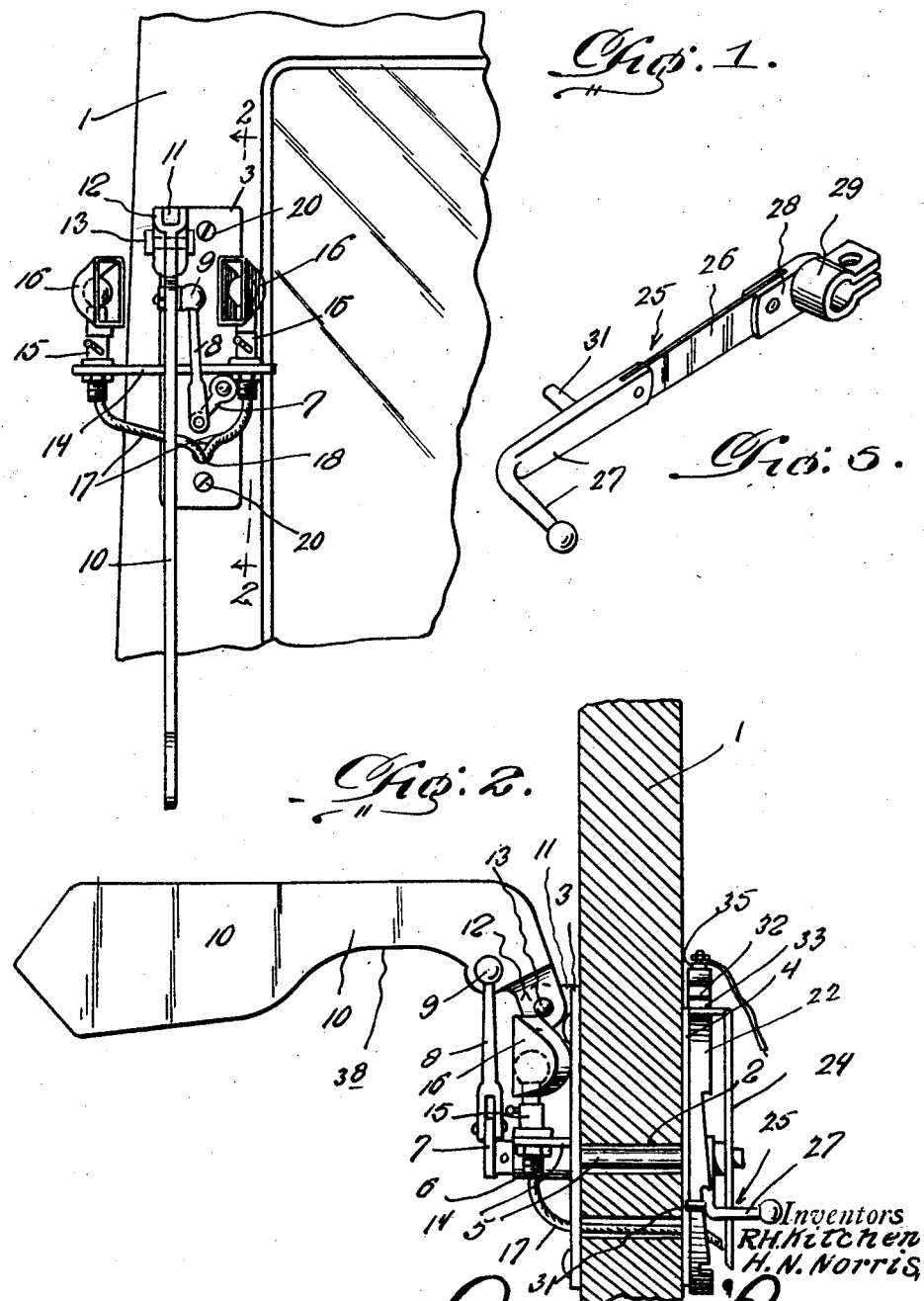

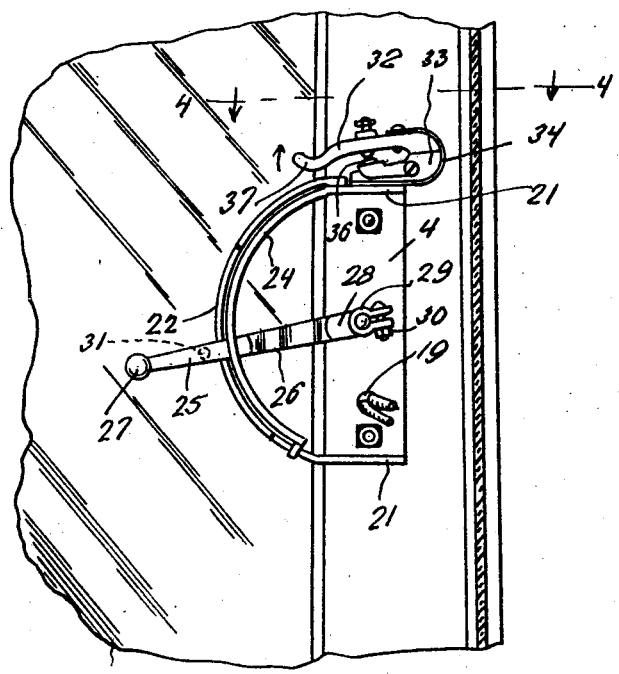
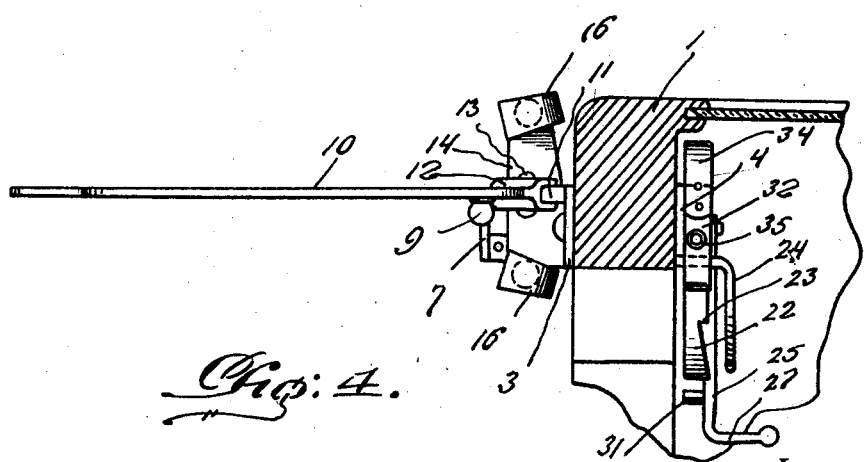

Patented Apr. 3, 1928.

1,664,751

UNITED STATES PATENT OFFICE.

ROBERT HAYDEN KITCHEN AND HENRY N. NORRIS, OF GRAYSON, KENTUCKY, ASSIGNORS OF ONE-THIRD TO AUSTIN FIELDS, OF GRAYSON, KENTUCKY.

DIRECTION INDICATOR.

Application filed March 15, 1926. Serial No. 94,937.

This invention relates to automobile direction indicators, and particularly to a signal of this type adapted for application to the closed type of body construction.

An object of the invention resides in providing a manually operable direction signal which has a pivoted signal arm adapted for positioning in three signalling positions at relative angles projecting outwardly from the side of the body and in non-signalling position to extend downwardly along the side of the body with an operating handle having cooperation with a suitable stop mechanism to retain the signalling arm in a desired signalling position.

The invention further comprehends the provision of a simple signal construction wherein a pair of bracket members are adapted to be mounted on the inside and outside of the top support of a closed body construction and provide bearings for the operating shafts of the signal arm which is mounted on the outer plate while the inner plate is provided with a handle retaining device for holding the signal in signalling position.

A further object of the invention resides in providing a novel construction of bearing and mounting plates for the signal arm and operating arm therefor in order that all of the parts of the mechanism may be operatively connected to this plate construction in a most simple manner, and which is further adapted to be formed from stamped sheet material.

The invention comprehends numerous other objects residing in the details of construction and relation of the parts for providing an efficient cooperation therebetween which are more particularly pointed out in the following detailed description and in the claims directed to a preferred form of the invention, it being understood, however, that various changes in the size, shape and arrangement of these parts may be made without departing from the spirit and scope of the invention as herein set forth.

In the drawings forming part of this application:

Figure 1 is a side elevational view of the front portion of the top of a closed automobile body, showing the invention mounted on the front left hand corner post of the body.

Fig. 2 is a vertical sectional view taken transversely through the signal, the automobile body as indicated by line 2—2 of Fig. 1.

Fig. 3 is an inside elevation of the corner post for the automobile body, showing the operating member for the signal arm and the switch mechanism carried by the inside switch member.

Fig. 4 is a horizontal sectional view taken on the line 4—4 of Fig. 3 and

Figure 5 is a perspective view of the connection for the operating handles.

The corner post of the front of a closed automobile body is indicated at 1 which is formed with openings 2 in predetermined relation, over which are mounted the outer and inner plate members 3 and 4 respectively. An operating shaft 5 is rotatably mounted in the inner and outer plates 3 and 4, and extends through one of the openings 2 as clearly shown in Fig. 2 of the drawing, a sleeve extension 6 on the outer plate forming a rigid bearing for this shaft.

An arm 7 is mounted on the outer end of this operating shaft and carries the link 8 pivotally connected thereto which is provided at its opposite ends with a ball and socket connection 9 to the signal arm 10 which is pivotally mounted on the projection 11 thru the provision of bifurcated ends 12 and pivot bolts 13.

The plate member 3 is formed with a laterally extending supporting flange 14 which is tangent to the sleeve extension 6 and formed therewith. The outer end of this supporting flange mounts the light socket 15 at opposite sides of the signal arm 10 as illustrated clearly in Fig. 1, which carry lamps for illuminating signal arms which are shielded by the reflectors 16 which reflect the light from the lamps in the sockets 15 onto the signal arm in its signalling position. The circuit wire 17 for these lamps are extended through the opening 18 in the bottom portion of the plate 3 and through another of the openings 2 to the inside of the body of the automobile through the opening 19 in the inner plate 4. The sockets 15 are provided with arms for operating relatively rotatable portions of the socket member to operate as a switch and connect and disconnect the lamp bulb with the source of energy through the wire 17 and in additional suitable switches may be provided on the instrument board of the automobile which is not shown for further controlling the circuit to these lights.

The inner plate member 4 and the outer plate member are suitably secured in assembled relation by the bolts 20 extending entirely through the corner post 1 of the automobile body and the upper and lower ends of this inner plate 4 are provided with the lateral projections 21. These lateral projections 21 are connected by the arcuately formed member 22 which is provided with a plurality of shoulders as at 23 while a guard member 24 of similar arcuate shape to the portion 22 is mounted in spaced relation to the shouldered edge thereof and forms a guard for the operating handle 25 mounted on the operating shaft 5. This operating handle includes a resilient section 26 together with a handle portion 27 which is adapted to engage and cooperate with the shoulders 23 on the arcuate portion 22 of the inner plate so that the operating lever may be retained in any one of a plurality of set positions of adjustment governed by the position of the shoulders 23. The inner end of this lever is provided with a head 28 having a bifurcated shaft receiving socket 29 to which a lock bolt 30 is applied for rigidly locking the head 29 on the operating shaft 5. The resilient section 26 permits lateral movement of the handle portion 27 which extends between the arcuate portion 22 and the guard 24 so that the operating handle may be suitably controlled for raising the signal arm 10 or permitting the same to lower to inoperative position, in any desired manner.

The spring 26 normally has a tendency to seat the operating arm under one of the notches 23 to hold the signal arm in any position of adjustment.

This operating handle 25 of the operating arm is provided with a laterally projecting stud 31 which is adapted to engage and operate the pivoted contact member 32 pivotally mounted on the stationary contact member 33 which is carried by the upper lateral projection 21. These contact members which are formed of suitable insulating material and pivotally connected by the spring 34 normally operate to engage the contacts 35 and 36 respectively carried thereby for closing the controlled circuit.

The circuit wires from the lamps carried in the socket 15 are suitably connected with the contacts 35 or 36 of this switch mechanism, one of which is also connected with a suitable source of energy such as the battery of the automobile in order to close the circuit to the lamp when the operating arm is moved out of the non-signalling position. This non-signalling position of the operating arm is at the top of the arcuate portion 22 so that as the signal arm 10 drops to the non-signalling position alongside of the corner post in a depending position, the operating arm 25 will move upwardly on the shaft 5 until the stud 31 engages the curved end 37 of the movable switch arm 32 which will raise the said arm 32 and disengage the contacts 35, 36 respectively. When the main controlling switch to the lamp in the socket 15 is closed, this switch member carried by the inner plate will automatically control the light so that when the signal arm and operating lever are in the inoperative position, the circuit to the light will be opened and when the signal is moved to any inoperative position, the circuit to the light will be closed to illuminate both sides of the arm 10.

The operating arm 25 for the signal arm in this way performs a two-fold function as it serves to automatically control the circuit to the illuminating device for the arm. This signal arm 10 is constructed more particularly as shown in Fig. 2 with a portion cut away as indicated at 38 to permit the arm to drop into a depending position so that the inner edge of the arm beyond this cut away portion 38 will engage the outside surface of the post 1, and lie sufficiently close to the side of the automobile body that it is not ordinarily noticed until projected into signalling position by the operation of the arm 25.

From the above description, it should thus be clearly understood that the invention is directed to the provision of a simple construction for an automobile direction signal applicable to the closed type of bodies on automobiles in which a pair of specially constructed plate members form principal features of the invention in order to provide a mounting for the remaining operative parts of the signal. In addition, the inner plate is formed to provide the arcuate portion having the shoulders 23 for receiving and locking the operating arm 25 against movement to the inoperative position.

The laterally springing movement of the arm will normally tend to hold the signal arm in operative position while the weight of the signal arm normally operates to return the same to inoperative position by gravity.

Having thus described our invention, what we claim as new is:—

1. In a direction signal, a pair of attaching plates, a shaft rotatably carried thereby, a signal arm pivotally connected at one end to one of said plates for vertical swinging movement, said plate having a light supporting flange adapted to provide illuminating means at opposite sides of the signal arm, an arm rotatably mounted on said shaft, a link attached at one end thereto and having a ball formed at its opposite end, a socket member carried by said signal arm for receiving said ball whereby to form a swivel connection between the link and signal arm, a quadrant attached to the opposite plate and a sectional operating handle arranged on the end of the shaft adjacent thereto, including an intermediate section of spring-pressed material adapted to yieldably retain the handle in engagement with the quadrant for securing the signal arm in a predetermined signalling position.

2. In a direction signal, a pair of attaching plates, a shaft rotatably carried thereby, a signal arm pivotally connected at one end to one of said plates for vertical swinging movement, said plate having a light supporting flange adapted to provide illuminating means at opposite sides of the signal arm, an arm rotatably mounted on said shaft, a link attached at one end thereto and having a ball formed at its opposite end, a socket member carried by said signal arm for receiving said ball whereby to form a swivel connection between the link and signal arm, a quadrant attached to the opposite plate and an operating handle arranged on the end of the shaft adjacent thereto and coacting with said quadrant for retaining the signal arm in a predetermined signaling position.

In testimony whereof we affix our signatures.

ROBERT HAYDEN KITCHEN.
HENRY N. NORRIS.